United States Patent
Xu et al.

(10) Patent No.: US 10,341,437 B2
(45) Date of Patent: Jul. 2, 2019

(54) ADDING LOGICAL SHARDING TO A DISTRIBUTED SYSTEM WITH ONLY PHYSICAL SHARDING

(71) Applicant: Nicira, Inc., Palo Alto, CA (US)

(72) Inventors: Gang Xu, Palo Alto, CA (US); Igor Ganichev, San Jose, CA (US); Ganesan Chandrashekhar, Campbell, CA (US)

(73) Assignee: Nicira, Inc., Palo Alto, CA (US)

( * ) Notice: Subject to any disclaimer, the term of this patent is extended or adjusted under 35 U.S.C. 154(b) by 138 days.

(21) Appl. No.: 15/427,738

(22) Filed: Feb. 8, 2017

(65) Prior Publication Data

US 2018/0227364 A1    Aug. 9, 2018

(51) Int. Cl.
*G06F 15/173*    (2006.01)
*H04L 29/08*    (2006.01)

(52) U.S. Cl.
CPC .......... *H04L 67/1097* (2013.01); *H04L 67/26* (2013.01); *H04L 67/2842* (2013.01); *H04L 67/303* (2013.01)

(58) Field of Classification Search
CPC ... H04L 67/1097; H04L 67/303; H04L 67/26; H04L 67/2842; H04L 29/08
See application file for complete search history.

(56) References Cited

U.S. PATENT DOCUMENTS

| | | | |
|---|---|---|---|
| 7,739,677 B1 * | 6/2010 | Kekre | G06F 11/202 709/214 |
| 10,050,870 B2 | 8/2018 | Reddy et al. | |
| 2013/0103817 A1 * | 4/2013 | Koponen | G06F 9/45558 709/223 |
| 2015/0215788 A1 | 7/2015 | Liu et al. | |
| 2017/0013058 A1 | 1/2017 | Annamalai et al. | |
| 2017/0041801 A1 | 2/2017 | Liu et al. | |
| 2017/0295021 A1 | 10/2017 | Gutiérrez et al. | |
| 2017/0310611 A1 | 10/2017 | Kumar et al. | |
| 2017/0339072 A1 | 11/2017 | Pignataro et al. | |
| 2017/0359252 A1 | 12/2017 | Kumar et al. | |
| 2018/0052902 A1 * | 2/2018 | Leiseboer | G06F 17/3056 |
| 2018/0091420 A1 | 3/2018 | Drake et al. | |
| 2018/0189369 A1 | 7/2018 | Baek et al. | |
| 2018/0198717 A1 | 7/2018 | Khasnabish et al. | |
| 2018/0219726 A1 | 8/2018 | Wang et al. | |
| 2018/0227221 A1 | 8/2018 | Starsinic et al. | |
| 2018/0227226 A1 | 8/2018 | Lu et al. | |
| 2018/0270113 A1 | 9/2018 | Nainar et al. | |
| 2018/0331951 A1 | 11/2018 | Boutros et al. | |

OTHER PUBLICATIONS

RFC 7665, "Service Chaining (SFC)Architecture", IETF, Oct. 2015 (Year:2015).

* cited by examiner

*Primary Examiner* — Cheikh T Ndiaye
(74) *Attorney, Agent, or Firm* — Patterson + Sheridan LLP

(57) ABSTRACT

Certain embodiments described herein are generally directed to processing domain objects in a distributed system using logical sharding. In some embodiments, a central control plane (CCP) node receives a domain object. In some embodiments, if the CCP node determines that the domain object is not already present in a shared data store and that the CCP node is the logical master of the domain object, the CCP node generates a status based on the domain object, and stores the status and domain object in the shared data store. In some embodiments, the shared data store notifies the plurality of CCP nodes of the stored status and domain object.

21 Claims, 4 Drawing Sheets

ADDING LOGICAL SHARDING TO A DISTRIBUTED SYSTEM WITH ONLY PHYSICAL SHARDING

BACKGROUND

A software defined networking (SDN) infrastructure may include a management plane, one or more control planes, and a data plane. The management plane generally provides configuration, monitoring, and management services for the network. Control planes determine the network topology and maintains and distributes configuration information for network entities such as switches, routers, virtual machines, etc. A network may include a central control plane (CCP) as well as local control planes (LCP) at different network elements. The data plane carries user traffic, and typically includes a plurality of physical or virtual hosts. Sharding is a mechanism used to provide high scalability and availability of a CCP by identifying "master" nodes among a plurality of nodes within the CCP for handling data from particular sources or of particular types. Master roles may be determined by individual CCP nodes, such as based on a predetermined hash algorithm, which may be provided by a user from the management plane.

One type of sharding is physical sharding, in which one CCP node serves as the physical master of each host in the data plane. Another type of sharding is logical sharding, in which one CCP node serves as the logical master for each logical entity, such as logical routers, logical switches, and domain objects received from the management plane. A domain object may be a logical representation of an item in a particular domain, such as a rule or policy. While most systems only employ one type of sharding, there are cases in which it becomes useful to employ both types of sharding in parallel. For example, in a system which employs physical sharding, a category of domain objects may be introduced which is handled more efficiently by logical sharding. One such category could be, for example, distributed network encryption (DNE) key policies. DNE involves distributing encryption functionality across multiple network entities in a network in order to enhance security. A DNE key policy may be related to multiple hosts in the data plane, and each of these hosts may have a different CCP node as its physical master. If the DNE key policy requires additional processing from a CCP node before being provided to the hosts to which the policy relates, it would be inefficient to have this processing be performed by multiple CCP nodes. Based on the DNE key policy, a CCP node may generate key information (such as IDs for the keys and the Security Parameter Index (SPI) for packet headers) for the hosts to use. This generated key information may be based on an individual CCP node's confidential information (such as its secure shell (SSH) certificate). Further, different CCP nodes may generate different key information for the same key policy (for example, the IDs may be generated randomly and different CCP nodes may generate different random numbers). Thus, if only physical sharding is employed, the generated key information may be different for each CCP node, resulting in inconsistent data paths, and encryption/decryption may therefore not function properly. As such, it may be advantageous to employ a logical sharding mechanism for these domain objects so that each domain object is only processed by one CCP node regardless of how many hosts in the data plane the domain object relates to.

Adding logical sharding in this manner to a system that otherwise employs physical sharding can present certain difficulties, however. For example, the CCP node which is the logical master of a domain object may not be the physical master of every host in the data plane to which the domain object must be published. Furthermore, the physical sharding mechanism may not wait until a logical sharding operation is complete before publishing an object to the data plane, and this may result in incomplete or out-of-date information being provided to hosts. Accordingly, a method is needed for adding logical sharding to a physical sharding architecture in a manner which allows for up-to-date domain objects to be provided to all relevant hosts.

SUMMARY

Herein described are one or more embodiments of a method for processing domain objects in a distributed system using logical sharding. The method includes receiving, by a central control plane (CCP) node, a domain object. If the CCP node determines that the domain object is not already present in a shared data store and that the CCP node is the logical master of the domain object, the method further includes generating, by the CCP node, a status for the domain object based on the domain object, and storing, by the CCP node, the status and domain object in the shared data store. The shared data store may notify the plurality of CCP nodes of the stored status and domain object.

Also described herein are embodiments of a non-transitory computer readable medium comprising instructions to be executed in a computer system, wherein the instructions when executed in the computer system perform the lightweight method described above for adding logical sharding to a distributed system with only physical sharding.

Also described herein are embodiments of a computer system, wherein software for the computer system is programmed to execute the lightweight method described above for adding logical sharding to a distributed system with only physical sharding.

DETAILED DESCRIPTION

Embodiments presented herein relate to adding logical sharding to a distributed system with only physical sharding. For example, in some embodiments, domain objects may be received from a management plane and handled by central control plane (CCP) nodes according to logical master roles (e.g., determined based on a predetermined hash algorithm). CCP nodes may store domain objects in local storage, such as a data cache. When a CCP node is the logical master of a domain object received from the management plane, the CCP node may process the domain object to determine a status, add the status to the domain object, and transmit the domain object to a shared data store, such as a database or repository. The CCP node may also transmit the domain object to any hosts in a data plane which relate to the domain object, and of which the CCP node is a physical master. Physical master roles may, for example, be determined by CCP nodes, such as based on a predetermined hash algorithm or based on a sharding table, which may comprise a table including logical identifiers of CCP nodes and hosts.

The shared data store may also implement a callback loop for domain objects it receives. For example, in some embodiments, the shared data store transmits each domain object it receives back to the plurality of CCP nodes after storing it. In this way, all of the CCP nodes are able to receive an updated version of the domain object which includes the status added by the CCP node which is the logical master of the domain object. Each CCP node may then pass the domain object to any hosts in the data plane which relate to the domain object, and of which the particular CCP node is the physical master.

Figure 1:
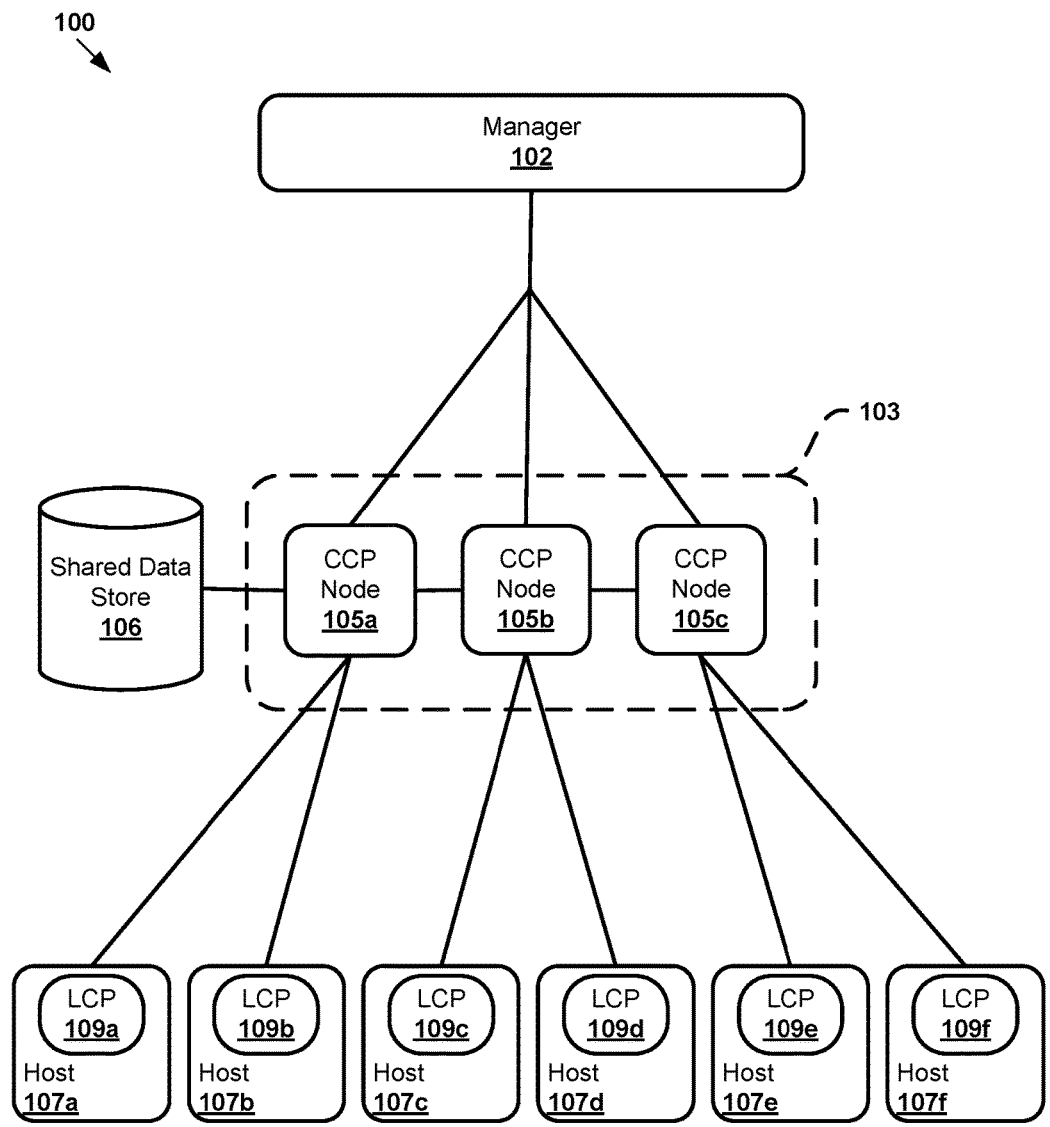
FIG. 1 is a block diagram illustrating exemplary components and planes of a network in which one or more embodiments of a method for processing domain objects in a distributed system using logical sharding may be implemented.

FIG. 1 is a block diagram of a network 100 in which one or more embodiments of a method for processing domain objects in a distributed system using logical sharding may be implemented. It should be understood that network 100 may include additional and/or alternative components than that shown, depending on the desired implementation. Network 100 includes a manager 102. The manager 102 may configure, monitor, and manage entities in the network, and may comprise one or more user interfaces and/or application programming interfaces for receiving user input from users such as network administrators or automation/orchestration or other management components. Manager 102 may produce domain objects, which may be based on user input. Generally, a domain object is a logical container of domain information, and represents a logical entity in the relevant domain. A domain object may, for example, comprise a key policy which relates to the domain of distributed network encryption (DNE), and the key policy may be based on user-defined parameters. Other types of domain objects may be produced by manager 102 as well, and may represent logical entities in other relevant domains. Manager 102 may be implemented by one or more physical machines (e.g. a server computer, desktop computer, personal computer, tablet computer, mainframe, blade computer etc.) or virtual computing instances (e.g., virtual machine, container, data compute node) supported by physical computing devices, etc.

Network 100 further includes a central control plane (CCP) cluster 103, which may be implemented as a cluster of one or more physical or virtual servers. In the embodiment depicted, CCP cluster 103 is implemented as a plurality of CCP nodes 105. A CCP node (e.g., CCP node 105a) may refer generally to a physical or virtual server which receives and handles packets from other network entities. In practice, CCP cluster 103 may be implemented as a cluster of three CCP nodes 105a-105c as shown, or fewer or greater number of CCP nodes.

Network 100 further includes a shared data store 106, which is accessible by each of CCP nodes 105, and may comprise a database, repository, file server, or other storage entity. Shared data store 106 may be implemented by a physical machine (e.g. a dedicated or distributed storage area network (SAN) server computer(s) or network attached storage) or virtual SAN, distributed or centralized database, or other data storage resource or combination. Shared data store 106 is configured to allow each of CCP nodes 105 to both store and retrieve data, and may be included as part of one or more of CCP nodes 105 or as a separate entity (as shown).

Network 100 further includes a plurality of hosts 107. Each host 107 comprises a local control plane (LCP) 109. While six hosts 107a-107f are depicted, there could be more or fewer hosts 107. A host 107 may, for example, comprise a hardware computing platform (e.g., a server computer, desktop computer, personal computer, tablet computer, mainframe, blade computer etc.) or a cluster of hardware computing platforms. Each hardware computing platform includes one or more central processing units (CPUs), system memory, storage, and one or more network interfaces for communicating with other hardware computing platforms within host 107 and/or network destinations outside of host 107. Each host 107 may execute a hypervisor. The hypervisor may include an LCP 109, which may, for example, comprise a software entity which performs control functions for a hypervisor. A hypervisor may, for example, comprise a software entity which executes one or more virtual machines. Though host 107 is described as supporting one or more virtual machines, host 107 may support other virtual computing instances (e.g., containers (e.g., Docker containers), data compute nodes, isolated user space instances, etc.). A hypervisor may serve as an interface between hosted virtual machines and a physical network interface, as well as other physical resources available on host 107. Hosts 107 may be considered part of a "data plane", and may forward traffic according to information provided in domain objects from CCP nodes 105. The hosts 107 may be connected by a physical network.

As discussed, a CCP node 105 may receive a domain object either from manager 102 or as the result of the callback loop from shared data store 106. The CCP node 105 may determine whether received domain object corresponds to a domain object which is already stored in shared data store 106, as this would indicate that the domain object has already been processed by a CCP node 105, and is ready to be sent to the data plane. If the domain object does not correspond to a domain object in shared data store 106, then the CCP node 105 may determine whether it is the logical master of the received domain object. As addressed above, this determination may be based on a predetermined hash algorithm provided from the manager 102. If the CCP node 105 is the logical master of the domain object, then the CCP node 105 may process the domain object to produce a status, and may add the status to the domain object. In some embodiments, the status may be information related to utilizing the domain object at a host. In the context of distributed network encryption (DNE), for example, the status may comprise an encryption key or a ticket which would allow an encryption key to be obtained from a third party. The CCP node 105 may then transmit the domain object to the shared data store. Additionally, the CCP node 105 may determine whether it is the physical master of any hosts in the data plane which relate to the domain object. If so, the CCP node 105 may provide the domain object to these hosts.

Only the logical master of a domain object processes the domain object to determine a status, so if a received domain object is not yet in shared data store 106 and the CCP node 105 is not the logical master of the received domain object, the CCP node 105 may locally store the domain object and take no further action. If, on the other hand, a received domain object is already present in shared data store 106, this indicates that the domain object has already been processed. In this case, the CCP node 105 may determine whether it is the physical master of any hosts in the data plane which relate to the domain object, and provide the domain object to these hosts.

The term "layer-2" generally refers to a data link layer (e.g., Media Access Control (MAC) or Ethernet layer), "layer-3" to a network layer (e.g., Internet Protocol (IP) layer), and "layer-4" to a transport layer (e.g., Transmission Control Protocol (TCP) layer) in the Open System Interconnection (OSI) model, although the concepts described herein and referred to simply as "MAC" and "IP" may be applicable to corresponding layers in other networking models. The term "packet" may refer generally to a group of bits that can be transported together, and may be in another form, such as "frame", "message", "segment", etc. In some embodiments, the packet may include a payload (e.g., data) and header information, such as a source MAC address corresponding to the MAC address of the node that generated the packet, a source TCP or UDP port corresponding to the port assigned to the application that generated the packet, a destination MAC address corresponding to the MAC address of the destination node, a destination TCP or UDP port corresponding to the port assigned to the destination application and/or a protocol used for the packet.

Figure 2:
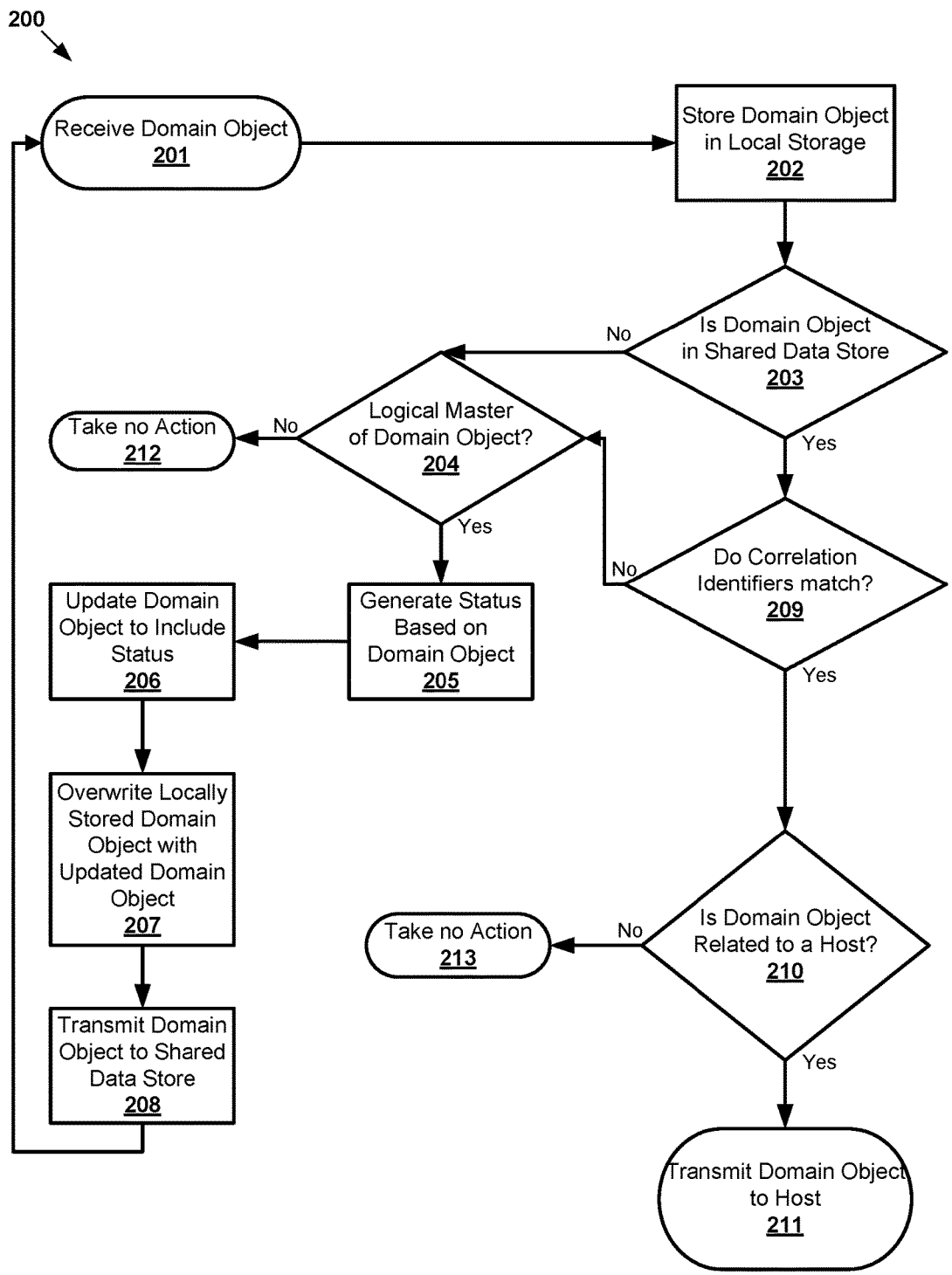
FIG. 2 is a flow chart depicting steps for handling a domain object using logical sharding in a distributed system with physical sharding.

FIG. 2 is a flow chart depicting a process 200 for handling a domain object using logical sharding in a distributed system with physical sharding, such as the network 100 of FIG. 1. Specifically, process 200 involves a number of components described above with respect to FIG. 1, and may be implemented by one of the plurality of CCP nodes 105.

At 201, CCP node 105 receives a domain object. The domain object may, for example, be received from manager 102 or shared data store 106. In the present embodiment, it is not necessary for CCP node 105 to know which source the domain object comes from at this stage. The domain object may comprise, for example, a key policy related to DNE. Information included within the domain object may comprise, for example, object data (e.g. the contents of the domain object), an object identifier which uniquely identifies the domain object, and/or a correlation identifier which uniquely identifies this particular version of the domain object. The correlation identifier may be included in order to ensure that a particular version of a domain object is not processed more than once, and that CCP nodes 105 wait until the particular version of the domain object has been processed before transmitting it to the data plane as discussed further herein. The domain object may further comprise a status field, which may or may not be populated. For example, if the domain object has already been processed by its logical master, and is presently received as the result of a callback from shared data store 106, the domain object may include a populated status field. If the domain object has not yet been processed, and is presently received from the manager 102, however, the status field may not be populated.

At 202, CCP node 105 stores the received domain object in local storage. The local storage may comprise, for instance, a data cache located within or associated with CCP node 105. At 203, CCP node 105 determines whether the domain object corresponds to any domain objects which are already present in shared data store 106. This determination may be made, for instance, by comparing the object identifier of the domain object with object identifiers of domain objects stored in shared data store 106. If the domain object is found not to exist in shared data store 106, then operations continue to 204, which is addressed below. If the domain object is found to already exist in shared data store 106, then operations continue to 209, where CCP node 105 determines whether the correlation identifier of the domain object matches the correlation identifier of the corresponding domain object which exists in shared data store 106. If the correlation identifiers do not match, then operations continue to 204, which is addressed below. Otherwise, operations continue to 210.

At 210, CCP node 105 determines whether the domain object relates to any hosts 107 in the data plane. More particularly, CCP node 105 determines whether any hosts 107 of which it is the physical master are related to the domain object. CCP node 105 may determine whether it is the physical master of a host 107 based on a predetermined hash algorithm or sharding table, and may determine whether a domain object is related to a host 107 based on information included within the domain object. For example, the domain object may include identifiers of hosts 107 to which it relates. If the domain object does not relate to any hosts 107 of which CCP node 105 is the physical master, then, at 213, CCP node 105 takes no further action.

If the domain object does relate to one or more hosts 107 of which CCP node 105 is the physical master, then, at 211, CCP node 105 transmits the domain object to the one or more hosts 107, thus completing the process 200. Because each CCP node 105 performs this process 200 for every domain object received, all relevant hosts 107 receive a particular domain object once it has been processed by its logical master, updated to include a status, and transmitted to shared data store 106.

At 204, CCP node 105 has determined that the domain object is not already present in shared data store 106 or that a corresponding domain object present in shared data store 106 does not have a matching correlation identifier. Accordingly, at 204, CCP node 105 determines whether it is the logical master of the domain object. This determination may be based on a hash algorithm, or other mechanism (e.g., table or other user-defined parameters) which is determined and provided to the plurality of CCP nodes in advance 105 from manager 102. If CCP node 105 determines that it is not the logical master of the domain object, then, at 212, CCP node 105 will take no action with respect to the domain object. This is because, when the domain object has not yet been processed to determine a status, the domain object should only be processed by its logical master.

If CCP node 105 determines that it is the logical master of the domain object, then, at 205, CCP node 105 generates a status based on the domain object.

At 206, CCP node 105 updates the domain object to include the status. For example, an existing status field of the domain object may be populated with the status. Alternatively, the status may be appended to the domain object in a different way. At 207, CCP node 105 overwrites the locally stored copy of the domain object (stored at 202 above) with the current version of the domain object, including the status. Then, at 208, having completed processing of the domain object, CCP node 105 transmits the domain object to shared data store 106. At this point, shared data store 106 may store the received domain object, and may also trigger a callback, which will be addressed in detail below with respect to FIG. 3, thereby causing operations to return to 201.

Figure 3:
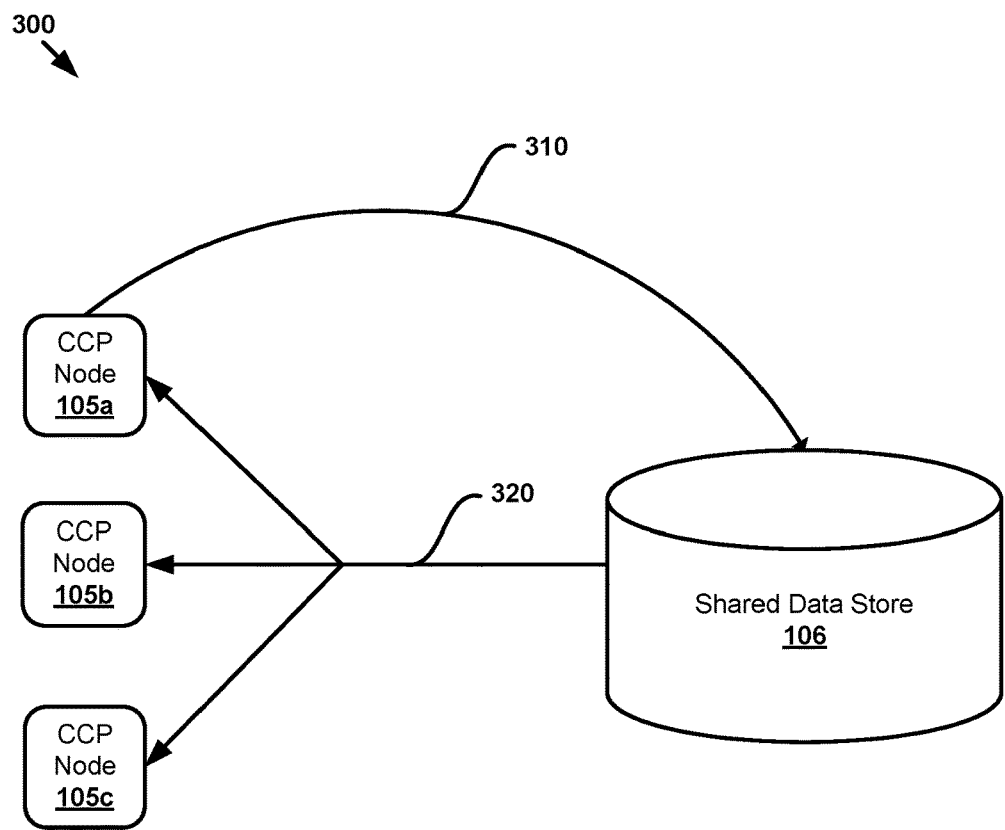
FIG. 3 is an illustration of a callback loop for writing and receiving domain objects to and from a shared data store.

FIG. 3 is an illustration of a callback loop 300 for writing and receiving domain objects to and from a shared data store in the network of FIG. 1. The callback loop 300 ensures that a domain object is provided to all hosts 107 to which it relates, as the CCP node 105 which is the logical master of a particular domain object may not be the physical master of all hosts 107 which are relevant to the particular domain object.

At 310, CCP node 105a transmits a domain object to shared data store 106. This may take place after CCP node 105a has processed the domain object to determine a status, and updated the domain object to include the status. Shared data store 106 receives the domain object and stores it. If shared data store 106 already has a version of this domain object, it may overwrite the old version with the new version. Alternatively, shared data store 106 may store the new version of the domain object separately.

At 320, shared data store 106 triggers a callback in order to transmit the domain object back to the plurality of CCP nodes 105. By this mechanism, each of CCP nodes 105a-105c receives the updated version of the domain object which includes the status determined by the domain object's logical master. At this point, each CCP node 105 performs the process illustrated in FIG. 2 with respect to the domain object.

Figure 4:
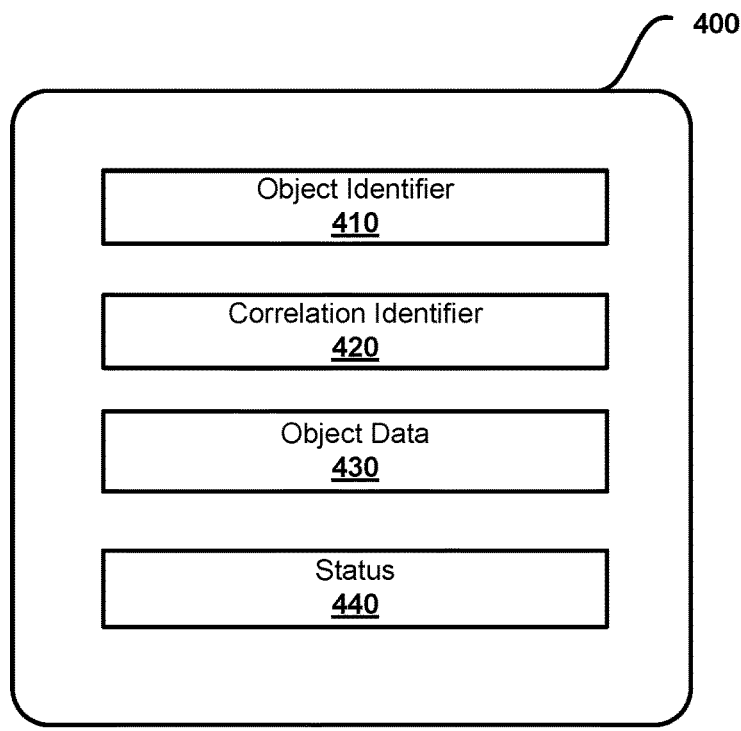
FIG. 4 is an illustration of an exemplary domain object according to certain embodiments.

FIG. 4 illustrates an exemplary domain object 400 according to certain embodiments. The items depicted are merely shown as an example, and other items may also be included as part of domain object 400, or certain items may be excluded from domain object 400. Domain object 400 may be generated within the manager 102, and the data it contains may be determined based on user input.

Domain object 400 includes an object identifier 410 which uniquely identifies the domain object. Object identifier 410 may, for example, comprise a string of alphabetical and/or numerical characters assigned to the domain object 400 within the manager 102. Object identifier 410 may be used by CCP nodes 105, shared data store 106, and hosts 107 to identify the domain object. In some embodiments, domain object 400 may not include an object identifier.

Domain object 400 further includes a correlation identifier 420 which uniquely identifies a version of domain object 400 which is published from manager 102. Correlation identifier 420 may, for example, comprise a string of alphabetical and/or numerical characters assigned to a particular version of domain object 400 within the manager 102. Each update to the domain object 400 which is published from the manager 102 may have a different correlation identifier 420, while maintaining the same object identifier 410 across different versions. CCP nodes 105, shared data store 106, and hosts 107 may use the correlation identifier 420 to identify a particular version of domain object 400, and may thereby ensure that a particular version of domain object 400 is only processed once by its logical master, and is published to all relevant hosts 107.

Domain object 400 further includes object data 430. Object data 430 may, for example, comprise the contents of a key policy related to DNE which is generated based on user input within the manager 102.

Domain object 400 may further include a status 440. The status 440 may initially comprise a field which is unpopulated when domain object 400 is published from the manager 102, as the status 440 may be subsequently determined and populated by the CCP node 105 which is the logical master of domain object 400. Alternatively, the status 440 may not be initially included in domain object 400 at all, and may be added to domain object 400 by the logical master of domain object 400. The inclusion of status 440 within domain object 400 allows CCP nodes 105 to add information to domain object 400 before providing it to hosts 107 within the data plane.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present application. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for processing domain objects in a distributed system using logical sharding, the method comprising:
   receiving, by a central control plane (CCP) node of a plurality of CCP nodes, a domain object;
   determining, by the CCP node, whether the domain object is present in a shared data store by comparing an object identifier of the domain object to object identifiers in the shared data store;
   upon determining the domain object is present in the shared data store, determining whether a correlation identifier of the domain object matches a respective correlation identifier corresponding to the domain object in the shared data store;
   upon determining the domain object is not present in the shared data store or upon determining the correlation identifier does not match the respective correlation identifier:
      determining, by the CCP node, whether the CCP node is a logical master of the domain object;
      upon determining the CCP node is the logical master of the domain object:
         generating, by the CCP node, a status for the domain object based on the domain object; and
         storing the status and the domain object in the shared data store, wherein the shared data store is configured to notify the plurality of CCP nodes of the stored status and domain object.

2. The method of claim 1, further comprising:
   receiving, by the CCP node, a second domain object;
   upon determining the second domain object is present in the shared data store:
      determining, by the CCP node, and based on the second domain object, whether a host is related to the second domain object; and
      upon determining the host is related to the second domain object, transmitting, by the CCP node, the second domain object to the host.

3. The method of claim 2, wherein the CCP node is a physical master of the host.

4. The method of claim 1, wherein the domain object comprises a key policy.

5. The method of claim 1, wherein the status comprises one of:
   an encryption key; and
   a ticket relating to an encryption key.

6. The method of claim 1, wherein the correlation identifier of the domain object uniquely identifies a version of the domain object.

7. The method of claim 1, wherein the shared data store notifies the plurality of CCP nodes of the stored status and domain object via a callback loop.

8. A non-transitory computer readable medium comprising instructions to be executed in a computer system, wherein the instructions when executed in the computer system perform a method for processing domain objects in a distributed system using logical sharding, the method comprising:
   receiving, by a central control plane (CCP) node of a plurality of CCP nodes, a domain object;
   determining, by the CCP node, whether the domain object is present in a shared data store by comparing an object identifier of the domain object to object identifiers in the shared data store;
   upon determining the domain object is present in the shared data store, determining whether a correlation identifier of the domain object matches a respective correlation identifier corresponding to the domain object in the shared data store;
   upon determining the domain object is not present in the shared data store or upon determining the correlation identifier does not match the respective correlation identifier:
      determining, by the CCP node, whether the CCP node is a logical master of the domain object;
      upon determining the CCP node is the logical master of the domain object:
         generating, by the CCP node, a status for the domain object based on the domain object; and
         storing the status and the domain object in the shared data store, wherein the shared data store is configured to notify the plurality of CCP nodes of the stored status and domain object.

9. The non-transitory computer readable medium of claim 8, wherein the method further comprises:
   receiving, by the CCP node, a second domain object;

upon determining the second domain object is present in the shared data store:
  determining, by the CCP node, and based on the second domain object, whether a host is related to the second domain object; and
  upon determining the host is related to the second domain object, transmitting, by the CCP node, the second domain object to the host.

10. The non-transitory computer readable medium of claim 9, wherein the CCP node is a physical master of the host.

11. The non-transitory computer readable medium of claim 8, wherein the domain object comprises a key policy.

12. The non-transitory computer readable medium of claim 8, wherein the status comprises one of:
  an encryption key; and
  a ticket relating to an encryption key.

13. The non-transitory computer readable medium of claim 8, wherein the correlation identifier of the domain object uniquely identifies a version of the domain object.

14. The non-transitory computer readable medium of claim 8, wherein the shared data store notifies the plurality of CCP nodes of the stored status and domain object via a callback loop.

15. A computer system comprising a processor and a non-transitory computer-readable medium storing instructions that, when executed, cause the processor to perform a method for processing domain objects in a distributed system using logical sharding, the method comprising:
  receiving, by a central control plane (CCP) node of a plurality of CCP nodes, a domain object;
  determining, by the CCP node, whether the domain object is present in a shared data store by comparing an object identifier of the domain object to object identifiers in the shared data store;
  upon determining the domain object is present in the shared data store, determining whether a correlation identifier of the domain object matches a respective correlation identifier corresponding to the domain object in the shared data store;
  upon determining the domain object is not present in the shared data store or upon determining the correlation identifier does not match the respective correlation identifier:
    determining, by the CCP node, whether the CCP node is a logical master of the domain object;
    upon determining the CCP node is the logical master of the domain object:
      generating, by the CCP node, a status for the domain object based on the domain object; and
      storing the status and the domain object in the shared data store, wherein the shared data store is configured to notify the plurality of CCP nodes of the stored status and domain object.

16. The computer system of claim 15, wherein the method further comprises:
  receiving, by the CCP node, a second domain object;
  upon determining the second domain object is present in the shared data store:
    determining, by the CCP node, and based on the second domain object, whether a host is related to the second domain object; and
    upon determining the host is related to the second domain object, transmitting, by the CCP node, the second domain object to the host.

17. The computer system of claim 16, wherein the CCP node is a physical master of the host.

18. The computer system of claim 15, wherein the domain object comprises a key policy.

19. The computer system of claim 15, wherein the status comprises one of:
  an encryption key; and
  a ticket relating to an encryption key.

20. The computer system of claim 15, wherein the correlation identifier of the domain object uniquely identifies a version of the domain object.

21. The computer system of claim 15, wherein the shared data store notifies the plurality of CCP nodes of the stored status and domain object via a callback loop.

* * * * *